United States Patent [19]

Tabuse et al.

[11] Patent Number: 4,472,485

[45] Date of Patent: Sep. 18, 1984

[54] STRETCHED COMPOSITE FILM

[75] Inventors: Akira Tabuse, Yamaguchi; Michio Nakatsukasa; Mitsuo Kamura, both of Tokuyama, all of Japan

[73] Assignee: Tokuyama Soda Kabushiki Kaisha, Yamaguchi, Japan

[21] Appl. No.: 443,588

[22] Filed: Nov. 22, 1982

[30] Foreign Application Priority Data

Nov. 25, 1981 [JP] Japan ................ 56-187768
Dec. 30, 1981 [JP] Japan ................ 56-214596

[51] Int. Cl.³ .................... B32B 27/08; B32B 3/20
[52] U.S. Cl. ......................... 428/516; 428/520; 428/910; 428/476.1; 428/483; 428/476.3; 264/176 R
[58] Field of Search .................. 428/516, 910, 520

[56] References Cited

U.S. PATENT DOCUMENTS

| | | |
|---|---|---|
| 3,862,265 | 1/1975 | Steinkamp et al. |
| 3,868,433 | 2/1975 | Bartz et al. |
| 3,931,449 | 1/1976 | Hirata et al. |
| 4,058,647 | 11/1977 | Inoue et al. |
| 4,079,850 | 3/1978 | Suzuki et al. ............ 428/516 |
| 4,198,327 | 4/1980 | Matsumoto et al. |
| 4,361,628 | 11/1982 | Krueger et al. .......... 428/516 |

FOREIGN PATENT DOCUMENTS

| | | |
|---|---|---|
| 53984 | 4/1977 | Japan . |
| 54784 | 5/1977 | Japan . |
| 57274 | 5/1977 | Japan . |
| 142482 | 12/1978 | Japan . |
| 1335791 | 10/1973 | United Kingdom . |

*Primary Examiner*—Patricia C. Ives
*Attorney, Agent, or Firm*—Sherman & Shalloway

[57] ABSTRACT

A stretched composite film composed of a first film layer (A) of a saponified product of an ethylene/vinyl acetate copolymer, and melt-laminated respectively to both surfaces of the first film layer (A), second film layers (B) and (B') of a blend composed of an unsaturated carboxylic acid-grafted polypropylene and polypropylene, said blend having (i) an ethylene content, $C_2$, of at most 0.6% by weight and (ii) a melt flow index, MFI, of not more than 25 g/10 minutes with (iii) the ethylene content ($C_2$) and the melt flow index (MFI) satisfying the expression $\log \text{MFI} \leq 1.4(1-C_2)$. The composite film optionally further comprises a third film layer (C) of a thermoplastic synthetic resin melt-laminated to the surface of one of the second film layers (B) and (B').

27 Claims, No Drawings

STRETCHED COMPOSITE FILM

This invention relates to a novel composite plastic film, and more specifically, to a stretched composite film having excellent oxygen gas barrier properties comprising a film of a saponified product of an ethylene/vinyl acetate copolymer as a base and films of a polypropylene-type polymer laminated to the base.

It is known that a film of a saponification product of ethylene/vinyl acetate copolymer (to be sometimes abbreviated "EVAOH" hereinafter) has excellent oxygen gas barrier properties. Various attempts have been made heretofore to impart oxygen gas barrier properties to plastic films having poor oxygen gas barrier properties by laminating an EVAOH film having excellent oxygen gas barrier properties. For example, it has been proposed to laminate a film of EVAOH to a biaxially stretched film of polypropylene.

Conventionally, an extrusion laminating method, a dry laminating method, and a co-extrusion laminating method using an adhesive resin together have been generally used to laminate EVAOH films. However, since there is a limit to the thickness of the laminated layer which these methods can reduce, the EVAOH layer of the resulting laminated film has a thickness more than that required, and this not only results in an increase in the thickness of the resulting composite film but also is economically disadvantageous.

In order to overcome this problem, a method has been proposed which comprises stretching the laminated film to reduce the thickness of the EVAOH layer (see, for example, Japanese Laid-Open Patent Publication Nos. 53984/1977, 54784/1977 and 57274/1977). Because the force of hydrogen bonding between the molecules of EVAOH is strong, stretching of the laminated film will result in cracking or blushing in the EVAOH layer, and markedly reduce the merchandise value of the resulting laminated film. Attempts have therefore been made to improve the stretchability of EVAOH films by adding a plasticizer such as glycerol and ethylene glycol, or locally heating the EVAOH layer by infrared rays, high-frequency radiation, etc. during film stretching. The improvement of stretchability according to such methods, however, is not sufficient, and sometimes causes an adverse effect of reducing the gas barrier property of the EVAOH film. In the production of such stretched laminated film having an EVAOH film layer, it is known to laminate polypropylene having a polar group to one or both surfaces of a polypropylene sheet by extrusion lamination, co-extrusion lamination, etc. in order to bond the EVAOH layer to the polypropylene sheet. This method comprises extruding the polypropylene in the molten state in a film form from an extruder onto a running polypropylene sheet, pressing the sheet between a casting roll and a nip roll, stretching it in a narrow space between the die end and the nip roll, and taking up the stretched film at a high speed.

For this purpose, the modified polypropylene used in the aforesaid laminate should have excellent draw-down property. However, since modified polypropylene generally used has poor draw-down property, lamination at high speeds of more than 30 meters/min. causes surging, and a uniform laminate sheet cannot be obtained. On the other hand, if modified polypropylene having a sufficiently high melt flow index is used, lamination can be effected at sufficient speeds for industrial practice. But this causes the defect that when the resulting laminate film is stretched, the EVAOH film layer undergoes blushing and the laminate film is not practical.

It has been desired therefore to develop an industrial process for producing a stretched composite film having oxygen gas barrier property, which can perform lamination at high speeds and does not cause cracking or blusing to the EVAOH film upon stretching of the laminated film.

It is an object of this invention therefore to provide a stretched composite film having oxygen gas barrier property which can be prepared by lamination at high speeds and by ordinary stretching means without the formation of cracks or blushes in the film, and a process for producing such a composite film.

Another object of this invention is to provide a stretched composite film which can be produced industrially, and to which oxygen gas barrier property can be fully imparted even when the thickness of a laminating film is reduced.

Other objects will become apparent from the following description.

According to one aspect of this invention, there is provided a stretched composite film composed of a first film layer (A) of a saponified product of an ethylene/vinyl acetate copolymer, and melt-laminated respectively to both surfaces of the first film layer (A), second film layers (B) and (B') of a blend composed of an unsaturated carboxylic acid-grafted polypropylene and polypropylene, said blend having (i) an ethylene content, $C_2$, of at most 0.6% by weight and (ii) a melt flow index, MFI, of not more than 25 g/10 minutes with (iii) the ethylene content ($C_2$) and the melt flow index (MFI) satisfying the expression $\log MFI \leq 1.4(1-C_2)$.

According to another aspect of this invention, there is provided a stretched composite film composed of a first film layer (A) of a saponified product of an ethylene/vinyl acetate copolymer, second film layers (B) and (B') of a blend composed of an unsaturated carboxylic acid-grafted polypropylene and polypropylene melt-laminated respectively to both surfaces of the first film layer (A), and a third film layer (C) of a thermoplastic resin melt-laminated to the surface of one of the second film layers (B) and (B'), said blend in the second film layers having (i) an ethylene content, $C_2$, of at most 0.6% by weight and (ii) a melt flow index, MFI, of not more than 25 g/10 minutes with (iii) the ethylene content ($C_2$) and the melt flow index (MFI) satisfying the expression $\log MFI \leq 1.4(1-C_2)$.

In the present specification and the appended claims, the terms "polypropylene" and "propylene polymer" denote not only a homopolymer of propylene but also copolymers of propylene with not more than 10 mole% of another copolymerizable monomer such as an olefin (e.g., ethylene or butylene).

EVAOH constituting the first film layer (A) which is a base of the composite film provided by this invention may be any grade of EVAOH having film-forming ability. Generally, suitable EVAOH copolymers have an intrinsic viscosity, measured at 30° C. in 15% aqueous phenol, of generally 0.07 to 0.17 l/g, preferably 0.09 to 0.15 l/g. The EVAOH desirably has an ethylene content of generally 15 to 50 mole%, preferably 20 to 40 mole%. EVAOH having a degree of saponification of at least 90%, preferably at least 99%, is convenient because it has excellent oxygen gas barrier property and good stretchability. From the viewpoint of processability, it is advantageous that EVAOH has a melt flow index of generally 1 to 50 g/10 minutes, preferably 5 to 25 g/10 minutes.

The second film layers (B) and (B') to be laminated to the surfaces of the film layer (A) of EVAOH contain a blend of unsaturated carboxylic acid-grafted polypropylene and polypropylene as an essential ingredient. It is critical in this invention that this blend should simultaneously meet the following three requirements.

(i) It should have an ethylene content, $C_2$, of 0 to 0.6% by weight, preferably up to 0.4% by weight, more preferably up to 0.2% by weight.

(ii) It should have a melt flow index, MFI, of not more than 25 g/10 minutes, preferably 1 to 20 g/10 minutes, more preferably 1 to 15 g/10 minutes.

(iii) The ethylene content ($C_2$) and the melt flow index (MFI) should satisfy the expression $\log \text{MFI} \leq 1.4(1 - C_2)$.

If these requirements are not met, cracks or blushes occur in the EVAOH film layer when the second film layers (B) and (B') are laminated to the EVAOH film layer (A) and the composite film is stretched. The resulting stretched film has no merchandise value.

When a stretched composite film as that provided by the present invention is to be produced in quantities on an industrial scale, it is of great technical importance whether lamination and stretching can be performed at high speeds. It has been found in accordance with this invention that by using the aforesaid blend having the aforesaid requirements is as a propylene polymer to be laminated to the EVAOH film layer (A), lamination and stretching at high speeds become possible without causing surging during the laminating operation.

It has further been found in accordance with this invention that when the above blend further has a flow index ratio (MFIR) of not more than 12, preferably not more than 10, more preferably not more than 9, lamination at much higher speeds, for example at 50 meters/min. or higher, can be carried out. Accordingly, from an industrial standpoint, it is preferable to use the blend having the above-specified MFIR in addition to the requirements (i), (ii) and (iii).

The melt flow index (MFI) value used in the present specification and claims is a value measured by the method described in ASTM D1238-52T. The melt flow index ratio (MFIR) value is defined as a quotient of the amount of polymer flow for 10 minutes under a load of 2160 g at 260° C. obtained by the MFI measurement in accordance with ASTM D1238-52T divided by the amount of polymer flow for 10 minutes at 260° C. under a load of 325 g obtained by the same MFI measurement.

The unsaturated carboxylic acid-grafted polypropylene used in the blend which satisfies the property requirements described above can be produced by methods known per se which involve graft-polymerizing a radical-polymerizable unsaturated carboxylic acid with polypropylene. They include, for example, the method shown in Japanese Patent Publication No. 27421/1968 in which the graft-polymerization is carried out in the molten state, the method shown in Japanese Patent Publication No. 15422/1969 in which the graft-polymerization is carried out in solution, the method shown in Japanese Patent Publication No. 18144/1968 in which the graft-polymerization is carried out in slurry, and the method shown in Japanese Laid-Open Patent Publication No. 77493/1975 in which the graft-polymerization is carried out in the gaseous state.

Suitable unsaturated carboxylic acids to be grafted to polypropylene include those which contain an ethylenically unsaturated bond and 1 or 2 carboxyl groups or the derivatives thereof such as the anhydride, ester, amide, imide or salt groups. Those having 3 to 12, preferably 3 to 6, carbon atoms are advantageously used. Specific examples include acrylic acid, methacrylic acid, maleic acid, fumaric acid, itaconic acid, citraconic acid, and the acid anhydrides, esters, amides, imides and metal salts thereof. Of these, unsaturated dibasic acid anhydrides, particularly maleic anhydride, are preferred.

It is to be understood that the term "unsaturated carboxylic acids", as used in the present specification and the appended claims, denotes not only free carboxylic acids but also their derivatives such as their anhydrides, esters, amides, imides, metal salts, etc.

The unsaturated carboxylic acid can be grafted in a proportion of generally 0.01 to 15% by weight, preferably 0.03 to 10% by weight, more preferably 0.1 to 1% by weight, based on the weight of polypropylene as a trunk polymer. By estimation for the production of the unsaturated carboxylic acid-grafted polypropylene, it is advantageous to react 100 parts by weight of polypropylene with generally 0.01 to 20 parts by weight, preferably 0.03 to 5 parts by weight, of the unsaturated carboxylic acid.

The trunk polypropylene is a homopolymer of propylene, or a copolymer of propylene with up to 10 mole% of another copolymerizable monomer, particularly with another olefin such as ethylene and butylene. Suitable propylene polymers for use as the trunk polymer have an intrinsic viscosity, measured in tetralin at 135° C., of generally 1.3 to 3.3 dl/g, preferably 1.83 to 2.7 dl/g, and a melt flow index (MFI) of generally 0.1 to 20 g/10 minutes, preferably 0.5 to 5 g/10 minutes.

The unsaturated carboxylic acid-grafted polypropylene can be obtained by grafting the aforesaid unsaturated carboxylic acid to the aforesaid polypropylene by known methods as those exemplified above. The unsaturated carboxylic acid-grafted polypropylene generally has a melt flow index (MFI) of more than 25 g/10 minutes, and as such cannot be used for the formation of the second film layers (B) and (B') in accordance with this invention.

According to the present invention, this unsaturated carboxylic acid-grafted polypropylene is blended with polypropylene having a low MFI to provide a blend having an MFI of not more than 25 g/10 minutes. Desirably, the polypropylene to be blended with the grafted polypropylene has a low MFI value generally in the range of 0.1 to 25 g/10 minutes, preferably 0.5 to 15 g/10 minutes.

Blending of the unsaturated carboxylic acid-grafted polypropylene with the low MFI polypropylene is carried out in a manner known per se, for example by using a melt-kneading machine such as an extruder or a Banbury mixer.

The blending ratio between the grafted polypropylene and the low MFI polypropylene cannot be generalized because it may vary depending upon the kinds of the grafted polypropylene and the low MFI polypropylene, and their MFI values, etc. It is important however to select the kinds and blending ratio of the grafted polypropylene and the low MFI polypropylene such that the resulting blend simultaneously satisfies the three requirements given hereinabove, i.e.

(i) Ethylene content ($C_2$) $\leq 0.6\%$ by weight, (ii) MFI ≦ 25 g/10 minutes, and
(iii) log MFI ≦ 1.4(1−$C_2$).

For example, when maleic anhydride-grafted polypropylene having an MFI of 40 to 100 g/10 minutes is used, it is convenient to mix modified polypropylene having an MFI of 0.1 to 15 g/10 minutes in an amount of 100 to 1000 parts by weight per 100 parts by weight of the grafted polypropylene.

As for the ethylene content, it is desirable that both polypropylene as the trunk polymer of the unsaturated carboxylic acid-grafted polymer and polypropylene of low MFI to be blended with the trunk polymer should not substantially contain ethylene units. If they contain ethylene units, they should be selected such that the total ethylene content of these polypropylenes is up to 0.6% by weight, preferably up to 0.4% by weight, based on the weight of the resulting blend.

The blend of the unsaturated carboxylic acid-grafted polypropylene and the low MFI polypropylene should have an MFI of not more than 25 g/10 minutes, and at the same time, its MFI should have the following relation to its ethylene content ($C_2$).

$$\log MFI \leq 1.4(1-C_2)$$

Any one skilled in the art would be able to select easily a blend satisfying this expression by conducting simple routine experiments.

The MFI of the polymer blend is given, for example, by the following equation.

$$\log Blend\ (MFI) = x_G \log (MFI_G) + x_L \log (MFI_L)$$

wherein
$MFI_G$ = MFI of the unsaturated carboxylic acid-grafted polypropylene (G-PP),
$MFI_L$ = MFI of polypropylene of low MFI,
$x_G$ = weight proportion of G-PP,
$x_L$ = weight proportion of low MFI polypropylene.

On the other hand, the ethylene content of the polymer blend is given by the following equation.

$$Blend\ (C_2) = x_G X[C_2]_G + x_L X[C_2]_L$$

wherein $[C_2]_G = C_2$ of G-PP $[C_2]_L = C_2$ of low MFI PP.

The types and blending proportions of the G-PP and the low MFI PP may be selected such that the MFI and $C_2$ of the resulting polymer blend satisfy the above equations.

Desirably, the kinds and blending ratio of the unsaturated carboxylic acid-grafted polypropylene and the low MFI polypropylene are adjusted such that the MFIR defined above of the resulting blend is generally not more than 12, preferably not more than 9.

A polymer blend having an MFIR in the above range may, for example, be prepared by melt-kneading polypropylene having a low MFI (generally 0.01 to 10 g/10 minutes) in an oxygen-containing gas atmosphere such as air to oxidatively decompose and/or thermally decompose it (the decomposed polypropylene may sometimes be referred to herein as modified polypropylene), and blending the modified polypropylene with the unsaturated carboxylic acid-grafted polypropylene.

In order to increase adhesion strength between the first film layer (A) of EVAOH and the second film layers (B) and (B') of the polypropylene blend, polyolefins other than polypropylene, such as ethylene-propylene copolymer elastomer (EPR), low-density polyethylene or linear polyethylene may be added, as required, to the polypropylene blend having the various properties described hereinabove. The amount of the other polyolefin to be added is not critical, and can be varied according to its kind. Generally, its suitable amount is 5 to 100 parts by weight, preferably 10 to 50 parts by weight, per 100 parts by weight of the polypropylene blend.

Two second films (B) and (B') composed of a polymer composition prepared by optionally adding the aforesaid other polyolefin to the polypropylene blend are laminated to both surfaces of the first film (A) of EVAOH. Formation of the respective films and melt lamination can be effected by methods known per se, for example, a co-extrusion lamination method, a tandem lamination method (see Manual of Lamination, a Japanese-language publication edited by Kako Gijutsu Kenkyukai), etc.

More specifically, a three-layer composite film [(B)/(A)/(B')] may be prepared, for example, by extruding the aforesaid polymer composition in the molten state in film form onto both surfaces of the first film (A) of EVAOH. The first film layer (A) of EVAOH in the unstretched state may have a thickness of generally 10 to 300 microns, preferably 10 to 100 microns. The second film layers (B) and (B') of the aforesaid polymer composition which are to be laminated to both surfaces of the first film layer (A) of EVAOH may have a thickness of generally 5 to 200 microns, preferably 10 to 100 microns, in the unstretched state.

According to another aspect of this invention, a third film (C) of a thermoplastic resin may be laminated to one surface of the three-layer composite film prepared as above. The thermoplastic resin film (C) may be prepared from any film-forming thermoplastic resin, such as polyamides (nylon), polyesters, polyolefins, etc. Generally, polyolefins such as polyethylene and polypropylene, above all polypropylene, are suitable. These thermoplastic resins desirably have an MFI of generally 1 to 25 g/10 minutes, preferably 5 to 15 g/10 minutes.

Lamination of the third film layer (C) of such a thermoplastic resin onto one surface of the three-layer composite film [(B)/(A)/(B')] can be effected by methods known per se. For example, a composite film can be prepared by melting the polymer composition and EVAOH, extruding the melt in film form through a three-layer co-extrusion T-die, and press-bonding the extruded three-layer molten film and a running third film of thermoplastic resin between a casting roll and a nip roll. Alternatively, a four-layer composite film may be prepared by melting the aforesaid polymer composition, extruding the melt through a T-die, laminating the extruded molten film to one surface of a film of thermoplastic resin in the manner described above, and in the same manner as above, melt-laminating EVAOH and the polymer composition successively to the laminate.

The three-layer [(B)/(A)/(B')] or four-layer [(B)/(A)/(B')/(C)] composite film so formed is then stretched to give the film of this invention.

Stretching may be carried out by using known methods and apparatuses. The stretched ratio can be varied according to the properties required of the stretched composite film as a final product. Generally, stretching is advantageously carried out at an area ratio of from 5 to 10. The composite film in accordance with this invention prepared as above has the advantage that even when it is stretched at an area ratio of 8 to 15, no cracks nor blushes occur in the EVAOH film layer.

The stretching may be monoaxial or biaxial. In the case of biaxial stretching, stretchings in the two directions may be effected simultaneously or sequentially. Generally, stretching is carried out under heat, usually at a temperature of at least about 145° C. but below the melting temperature of the aforesaid polypropylene blend forming the second film layer, preferably at a temperature of about 150° to about 180° C.

The composite film in accordance with this invention having the structure described hereinabove permits high-speed lamination. For example, it can be processed at a high speed of at least 50 meters/min., particularly at least 60 meters/min. When the blend in the second film layer meets the condition MFIR≦12 in addition to meeting the requirements (i), (ii) and (iii), lamination at a speed of as high as 70 meters/min. or more are possible.

Since the stretched composite film provided by this invention contains the EVAOH film as one layer, it has excellent gas barrier property. Furthermore, it has excellent transparency because the EVAOH film layer is free from cracks or blushes.

Furthermore, the composite film provided by this invention does not undergo surging even when it is subjected to high-speed lamination, and it is also possible to employ a high stretch ratio. Hence, according to this invention, the thickness of the composite film can be reduced to a very small value, and yet it can be converted to a stretched composite film having excellent gas barrier property and transparency.

The stretched composite film provided by this invention is used, for example, as a packaging material for foodstuffs susceptible to spoilage or degeneration by oxygen gas such as snack confections, biscuits and the like, fried confections and the like, miso, pickles, meat products, seafood pastes, dried bonito flakes, tea, etc., or as a packaging material for industrial component part, desired to be protected from corrosion.

The following Examples and Comparative Examples illustrate the present invention more specifically.

The variious properties given in the following examples were measured by the following methods.

MFI

Measured in accordance with ASTM D 1238-52T at 230° C. under a load of 2160 g.

MFIR

This is defined as the quotient of the amount of molten polymer flow for 10 minutes under a load of 2160 g at 260° C. obtained by the above MFI measurement divided by the amount of molten polymer flow for 10 minutes under a load of 325 g at the same temperature obtained by the above MFI measurement.

Amount of maleic anhydride

A sample film, 0.1 mm thick, was formed by a hot press. Its infrared absorption spectrum was measured, and from the absorption peak intensity of maleic anhydride at 1780 cm$^{-1}$, the amount of maleic anhydride was determined. The amount of grafted maleic anhydride was determined for a sample obtained by extracting the 0.1 mm thick film with acetone for 6 hours, and then drying the residual film in vacuum at 50° C. for 24 hours. The amount of the residual unreacted maleic anhydride is obtained by subtracting the amount of the grafted maleic anhydride from the total amount of maleic anhydride.

Haze

Measured in accordance with JIS K-6714.

EXAMPLE 1

(A) Production of a modified propylene polymer

The hopper portion of an extruder was purged completely with nitrogen gas, and while blowing a gaseous mixture of nitrogen gas and air containing 5% of $O_2$ ($N_2$:air=1/1) into the extruder, polypropylene having an MFI of 0.6 g/10 minutes was melt-kneaded at 240° C. in the extruder to give a modified propylene polymer having an MFI of 2.0 g/10 minutes and an MFIR of 11.6.

(B) Production of an unsaturated carboxylic acid-grafted polypropylene

One hundred parts by weight (all parts given hereinafter are by weight) of polypropylene having an MFI of 0.6 g/10 minutes and an ethylene content of 0% was mixed with 4 parts of maleic anhydride, 0.3 part of 2.5-dimethyl-2,5-di(t-butylperoxy)hexane, 0.1 part of butylated hydroxytoluene and 0.1 part of calcium stearate in a Henschel mixer for 5 minutes, and the mixture was melt-kneaded in an extruder kept at 220° C. The mixture was then heat-treated at 140° C. for 4 hours to give maleic anhydride-grafted polypropylene having an MFI of 60 g/10 minutes and containing 0.5% by weight of grafted maleic anhydride.

(C) Production of a polypropylene blend

Ninety parts of the modified propylene polymer obtained in (A) was mixed with 10 parts of the maleic anhydride-grafted polypropylene obtained in (B) above, and the mixture was melt-kneaded at 200° C. to form a polypropylene blend having an MFI of 3 g/10 minutes and an MFIR of 11.5 and containing 0.05% by weight of grafted maleic anhydride.

(D) Production of a stretched composite film

A mixture of the polypropylene blend (referred to as PPB for short) obtained in (C) above and 10.0% by weight of an ethylene-propylene elastomer (EPR) having an ethylene:propylene ratio of 80:20 by weight and an MFI at 230° C. of 6.4 g/10 minutes, and a saponified ethylene-vinyl acetate copolymer having an ethylene content of 25 mole% and a degree of saponification of 99.5% (referred to as EVAOH for short) were separately fed into extruders having a cylinder diameter of 65 mm and 45 mm, respectively, with a three-layer extrusion T-die attached thereto, then melted at 280° C. for the former and 240° C. for the latter, and extruded through the three-layer extrusion T-die kept at 240° C. to form a three-layer composite film (PPB/EVAOH/PPB) in which each PPB layer had a thickness of 100 microns and the EVAOH layer had a thickness of 40 microns.

The composite film was stretched to 10 times in an oven-type stretching machine kept at 153° C. The stretched composite film was totally free from blushing and cracking at the EVAOH layer and had a good appearance with a haze of 3.3%.

EXAMPLE 2

Stretched composite films were produced in the same way as in Example 1 except as noted in Table 1 below. The properties of the starting PPB and EVAOH were varied by varying the manufacturing conditions set forth in Example 1.

The results are shown in Table 1.

TABLE 1

| | PPB | | | | | | |
|---|---|---|---|---|---|---|---|
| Run No. | Ethylene content (wt. %) | Amount of maleic anhydride grafted (wt. %) | MFI (g/10 min.) | $\dfrac{1.4[1 - (C_2)]}{\log MFI}$ | MFIR | EPR Amount (wt. %) | PPB + EPR Thickness (microns) |
| 1 | 0 | 0.15 | 2.8 | 3.13 | 11.5 | 12.0 | 100 |
| 2 | 0.35 | 0.33 | 6.3 | 1.14 | 9.8 | 5.0 | 200 |
| 3 | 0 | 4.2 | 2.45 | 3.60 | 11.9 | 8.0 | 80 |
| 4 | 0.6 | 0.12 | 3.9 | 2.37 | 11.5 | 8.0 | 200 |
| 5 | 0 | 0.12 | 4.3 | 2.21 | 10.8 | 10.0 | 100 |
| 6 | 0 | 0.12 | 4.3 | 2.21 | 10.8 | 10.0 | 100 |
| 7 | 0.5 | 0.10 | 3.7 | 1.23 | 11.2 | 11.0 | 100 |
| 8 | 0 | 0.10 | 3.7 | 2.46 | 11.2 | 45.0 | 200 |
| 9 | 0.2 | 0.12 | 2.5 | 3.52 | 11.6 | 0 | 100 |
| 10 | 0 | 0.15 | 2.8 | | 11.8 | 0 | 100 |
| 11 | 0.4 | 0.15 | 3.5 | | 11.2 | 0 | 100 |

| | EVAOH | | | Stretching conditions | | Results | |
|---|---|---|---|---|---|---|---|
| Run No. | Ethylene content (mole %) | Degree of saponification (%) | Thickness (mirons) | Temperature (°C.) | Stretch ratio | Haze (%) | Appearance |
| 1 | 45 | 99.5 | 40 | 149 | 10 | 3.1 | Good |
| 2 | 45 | 99.5 | 20 | 149 | 14 | 2.8 | Good |
| 3 | 45 | 99.5 | 60 | 152 | 9 | 3.2 | Good |
| 4 | 45 | 99.5 | 40 | 148 | 10 | 3.0 | Good |
| 5 | 45 | 99.5 | 40 | 161 | 10 | 3.5 | Good |
| 6 | 45 | 99.5 | 20 | 160 | 10 | 3.4 | Good |
| 7 | 45 | 99.5 | 100 | 150 | 9 | 3.1 | Good |
| 8 | 45 | 99.5 | 20 | 148 | 10 | 4.2 | Good |
| 9 | 45 | 99.5 | 40 | 149 | 10 | 2.5 | Good |
| 10 | 45 | 99.5 | 40 | 149 | 10 | 2.9 | Good |
| 11 | 45 | 99.5 | 40 | 148 | 10 | 2.6 | Good |

COMPRATIVE EXAMPLE 1

A mixture of the polypropylene blend (PPB) having an ethylene content of 0% by weight, a grafted maleic anhydride content of 0.12% by weight and an MFI of 4.3 g/10 minutes and 10% by weight of the same EPR as used in Example 1, and EVAOH having an ethylene content of 45 mole% and a degree of saponification of 99.5% were separately fed into extruders having a cylinder diameter of 65 mm and 45 mm, respectively, with a two-layer extrusion T-die attached thereto, melted at 280° C. for the former and 240° C. for the latter, and extruded to form a two-layer composite film (PPB/EVAOH) in which the PPB layer had a thickness of 200 microns, and the EVAOH layer had a thickness of 40 microns.

The two-layer film was then stretched to 10 times in an oven-type stretching machine kept at 153° C.

The resulting stretched film had blushes at the EVAOH layer and lacked transparency.

COMPARATIVE EXAMPLE 2

Three-layer composite films (PPB/EVAOH/PPB) were produced in the same way as in Example 1 except that polypropylene blends having the properties shown in Table 2 were used. The composite films were each stretched under the conditions shown in Table 2. The results are shown in Table 2.

TABLE 2

| | PPB | | | | | | |
|---|---|---|---|---|---|---|---|
| Run No. | Ethylene content (wt. %) | Amount of maleic anhydride grafted (wt. %) | MFI (g/10 min.) | $\dfrac{1.4[1 - (C_2)]}{\log MFI}$ | MFIR | EPR Amount (wt. %) | PPB + EPR Thickness (microns) |
| 1 | 0 | 0.13 | 27 | 0.98 | 9.4 | 10 | 100 |
| 2 | 0.31 | 0.10 | 9.5 | 0.99 | 9.6 | 10 | 100 |
| 3 | 0.8 | 0.08 | 2.1 | 0.87 | 11.8 | 10 | 200 |
| 4 | 0 | 0.08 | 3.3 | 2.70 | 11.3 | 10 | 100 |
| 5 | 0 | 0.08 | 3.3 | 2.70 | 11.3 | 10 | 100 |
| 6 | 0 | 0.13 | 27 | | | 0 | 100 |
| 7 | 0.8 | 0.08 | 2.1 | | | 0 | 100 |

| | EVAOH | | | Stretching conditions | | Results | |
|---|---|---|---|---|---|---|---|
| Run No. | Ethylene content (mole %) | Degree of saponification (%) | Thickness (microns) | Temperature (°C.) | Stretch ratio | Haze (%) | Appearance |
| 1 | 45 | 99.5 | 40 | 150 | 10 | — | Blushing |
| 2 | 45 | 99.5 | 40 | 149 | 10 | — | Blushing |

TABLE 2-continued

| | | | | | | | |
|---|---|---|---|---|---|---|---|
| 3 | 45 | 99.5 | 40 | 150 | 10 | — | Blushing |
| 4 | 25 | 99.5 | 40 | 145 | 10 | 2.5 | Cracks occurred in EVAOH. |
| 5 | 25 | 99.5 | 40 | 190 | 10 | — | Film fractured |
| 6 | 45 | 99.5 | 40 | 149 | 10 | — | Blushing |
| 7 | 45 | 99.5 | 40 | 148 | 10 | — | Blushing |

EXAMPLE 3

The procedure of Example 2, No. 1 (Table 2) was repeated except that instead of the oven-type stretching machine, a continuous stretching machine kept at 180° C. was used and the film was stretched at a line speed of 50 meters/min.

The stretched film had a good appearance with a haze of 3.1%.

EXAMPLE 4

The procedure of Example 2, No. 1 (Table 2) was repeated except that instead of the three-layer co-extrusion T-die, an extruder having a cylinder diameter of 60 mm and equipped with a T-die was used, and a mixture of PPB and EPR melted at 280° C. was laminated in a thickness of 100 microns to both surfaces of a previously formed EVAOH film having a thickness of 40 microns.

The resulting film had a good appearance with a haze of 2.9%.

EXAMPLE 5

Polypropylene having an MFI of 1.1 g/10 minutes was fed into an extruder having a cylinder diameter of 60 mm and equipped with a T-die kept at 290° C., and extruded into a sheet having a thickness of 2 mm. The sheet was then stretched to 5 times in the longitudinal direction by a roll-type stretching machine whose roll surface was kept at 155° C.

The PPB blend containing EPR used in Example 2, No. 1 (Table 1) and EVAOH used in Example 2, No. 1 were laminated to the resulting monoaxially stretched sheet through a three-layer extrusion T-die to form a composite layer consisting of 20 micron PPB/40 micron EVAOH/20 micron PPB. The laminated sheet was stretched to 10 times in the transverse direction by an oven-type stretching machine kept at 150° C.

The resulting composite film had a good appearance with a haze of 3.2%.

EXAMPLE 6

The procedure of Example 2, No. 5 (Table 1) was repeated except that instead of EPR, an ethylene/butene-1 copolymer elastomer was added to PPB.

The resulting stretched film had a good appearance with a haze of 2.5%.

EXAMPLE 7

A modified propylene polymer having an MFI of 9.0 g/10 minutes and an MFIR of 11.6 was prepared in the same way as in Example 1, (A) except that polypropylene having an MFI of 2.7 g/10 minutes was used instead of the polypropylene having an MFI of 0.6 g/10 minutes.

Separately, maleic acid grafted polypropylene was prepared in the same way as in Example 1, (B) except that polypropylene having an MFI of 0.4 g/10 minutes and an ethylene content of 0.9% was used instead of the polypropylene having an MFI of 0.6 g/10 minutes, and the amount of maleic anhydride used was changed to 2 parts by weight. The maleic anhydride grafted polypropylene had an MFI of 42 g/10 minutes and the amount of maleic anhydride grafted was 0.25% by weight.

Seventy parts of the modified propylene polymer obtained as above, 20 parts of the maleic anhydride-grafted polypropylene obtained as above, and 10 parts of EPR having an MFI at 230° C. of 4 g/10 minutes and containing 1% by weight of ethylene based on propylene were mixed, and then melt-kneaded at 200° C. The mixture was heat-treated at 140° C. for 4 hours to give a polypropylene blend having an MFI of 11.9 g/10 minutes, an MFIR of 10.1, an ethylene content of 0% and a grafted maleic anhydride content of 0.05% by weight.

Then, the PPB and a saponified ethylene/vinyl acetate copolymer (EVAOH) were fed respectively into extruders having a cylinder diameter of 65 mm and 45 mm, respectively, with a three-layer co-extrusion T-die attached thereto, melted at 280° C. for the former and 240° C. for the latter, and extrusion-laminated through the co-extrusion T-die kept at 240° C. onto a polypropylene sheet having a thickness of 200 microns and stretched to 5 times in the longitudinal direction (PP sheet) to form a composite sheet consisting of PPB layer/EVAOH layer/PPB layer/PP sheet.

The composite sheet was stretched transversely in an oven-type stretching machine to obtain a stretched composite film. The stretching conditions and the results are shown in Table 3, No. 1.

In this Example, laminating speeds of more than 60 meters/min., which are sufficient for industrial practice, were obtained, and no blushing or cracking was observed in the EVAOH layer of the composite film. The other results are shown in Table 3, No. 1.

The above procedure was repeated except that the unsaturated carboxylic acid-grafted polypropylene, EPR, the modified propylene polymer, the polypropylene blend and EVAOH were changed as shown in Nos. 2 to 7 in Table 3, and the laminating speed and the stretching conditions were changed as shown in Table 3, Nos. 2 to 7.

The properties of the resulting stretched composite films are also shown in Table 3.

TABLE 3

| Unsaturated carboxylic acid-grafted polypropylene | | | |
|---|---|---|---|
| Amount of maleic | Modified polypropylene | Polypropylene blend | |

TABLE 3-continued

| Run No. | Ethylene content (wt. %) | anhydride grafted (wt. %) | MFI (g/10 min.) | Amount (wt. %) | Ethylene content (wt. %) | MFI (g/10 min.) | MFIR | Amount (wt. %) | Ethylene content (wt. %) | MFI (g/10 min.) | MFIR | $\dfrac{1.4[1-(C_2)]}{\log \text{MFI}}$ |
|---|---|---|---|---|---|---|---|---|---|---|---|---|
| 1 | 0   | 0.23 | 42 | 20 | 0   | 9   | 11.1 | 70 | 0    | 11.9 | 10.1 | 1.30 |
| 2 | 0.2 | 0.47 | 38 | 20 | 0   | 18  | 10.3 | 60 | 0.04 | 17.0 | 9.7  | 1.09 |
| 3 | 0   | 0.15 | 41 | 10 | 0.1 | 9.3 | 9.9  | 80 | 0.08 | 10.4 | 9.5  | 1.27 |
| 4 | 0.3 | 0.21 | 41 | 15 | 0.5 | 3.1 | 11.5 | 65 | 0.37 | 5.3  | 10.9 | 1.22 |
| 5 | 0   | 0.23 | 42 | 20 | 0.1 | 9   | 11.1 | 70 | 0.07 | 11.9 | 10.7 | 1.21 |
| 6 | 0   | 0.47 | 38 | 10 | 0   | 9   | 11.1 | 55 | 0    | 9.2  | 10.9 | 1.45 |
| 7 | 0   | 0.23 | 42 | 20 | 0   | 9   | 11.1 | 70 | 0    | 11.9 | 10.1 | 1.30 |
| 8 | 0.2 | 0.47 | 38 | 20 | 0   | 18  | 10.3 | 60 | 0.04 | 17.0 | 9.7  |      |
| 9 | 0.3 | 0.21 | 41 | 15 | 0.5 | 3.1 | 11.5 | 65 | 0.37 | 5.3  | 10.9 | 1.22 |

| Run No. | Amount of EPR added (wt. %) | Laminating thickness (microns) | EVAOH Ethylene content (mole %) | EVAOH Degree of saponification (%) | EVAOH Thickness (microns) | Laminating speed (m/min.) | Stretching conditions Temperature (°C.) | Stretching conditions Stretch ratio | Results Haze (%) | Results Appearance |
|---|---|---|---|---|---|---|---|---|---|---|
| 1 | 10 | 20 | 45 | 99.5 | 50 | 55 | 160 | 10 | 3.2 | Good |
| 2 | 20 | 10 | 45 | 99.5 | 40 | 70 | 148 | 10 | 3.4 | Good |
| 3 | 10 | 20 | 25 | 99.5 | 40 | 60 | 150 | 10 | 3.0 | Good |
| 4 | 20 | 20 | 45 | 99.5 | 40 | 55 | 150 | 10 | 3.3 | Good |
| 5 | 10 | 20 | 45 | 99.5 | 50 | 55 | 151 | 14 | 2.8 | Good |
| 6 | 35 | 20 | 45 | 99.5 | 50 | 65 | 149 | 9  | 4.2 | Good |
| 7 | 0  | 20 | 45 | 99.5 | 50 | 55 | 160 | 10 | 2.9 | Good |
| 8 | 0  | 10 | 45 | 99.5 | 40 | 70 | 148 | 10 | 2.9 | Good |
| 9 | 0  | 20 | 45 | 99.5 | 40 | 50 | 150 | 10 | 3.0 | Good |

EXAMPLE 8

Example 7 was repeated except that the unsaturated carboxylic acid-grafted polypropylene used in Example 7 was changed as shown in Table 4, and the modified propylene polymer was changed to the commercial polypropylene shown in Table 4.

In Run No. 2 of Table 4, the $1.4[1-(C_2)]/\log \text{MFI}$ was 0.96 which was outside the MFI conditions specified in this invention.

Thus, at a laminating speed of 50 meters/min., surging occurred both in the films of Nos. 1 and 2 of Table 4, and composite films of good quality could not be obtained. When in Run No. 2 of Table 4, the lamination was carried out at a low speed of 20 m/min. and the laminated product was stretched to 10 times, the EVAOH layer underwent blushing, and a stretched composite film having a good appearance could not be obtained.

TABLE 4

| Run No. | Unsaturated carboxylic acid-grafted polypropylene Ethylene content (wt. %) | Amount of maleic anhydride added (wt. %) | MFI (g/10 min.) | Amount (wt. %) | Commercial polypropylene Ethylene content (wt. %) | MFI (g/10 min.) | MFIR | Amount (wt. %) | Polypropylene blend Ethylene content (wt. %) | MFI (g/10 min.) | MFIR | $\dfrac{1.4[1-(C_2)]}{\log \text{MFI}}$ |
|---|---|---|---|---|---|---|---|---|---|---|---|---|
| 1 | 0   | 0.23 | 42 | 20 | 0   | 9.3  | 13.6 | 70 | 0    | 8.3  | 13.0 | 1.52 |
| 2 | 0.3 | 0.21 | 41 | 15 | 0.3 | 12.1 | 12.9 | 65 | 0.24 | 12.8 | 12.1 | 0.96 |

| Run No. | Amount of EPR (wt. %) | Laminating thickness (microns) | EVAOH Ethylene content (wt. %) | EVAOH Degree of saponification (%) | EVAOH Thickness (microns) |
|---|---|---|---|---|---|
| 1 | 10 | 20 | 45 | 99.5 | 50 |
| 2 | 20 | 20 | 25 | 99.5 | 40 |

COMPARATIVE EXAMPLE 3

Example 7 was repeated except that the unsaturated carboxylic acid-grafted polypropylene, the modified propylene polymer, and EVAOH were changed as shown in Table 5. The results are shown in Table 5. In any of the resulting composite films, the EVAOH layer developed blushing.

TABLE 5

| Run No. | Unsaturated carboxylic acid-grafted polypropylene Ethylene content (wt. %) | Amount of maleic anhydride grafted (wt. %) | MFI (g/10 min.) | Amount (wt. %) | Modified propylene polymer Ethylene content (wt. %) | MFI (g/10 min.) | MFIR | Amount (wt. %) | Polypropylene blend Ethylene content (wt. %) | MFI (g/10 min.) | MFIR | $\dfrac{1.4[1-(C_2)]}{\log \text{MFI}}$ |
|---|---|---|---|---|---|---|---|---|---|---|---|---|
| 1 | 0   | 0.15 | 35 | 20 | 0   | 31  | 9.8  | 70 | 0    | 25   | 9    | 0.97 |
| 2 | 0.3 | 3.13 | 40 | 20 | 0.3 | 8.2 | 11.5 | 70 | 0.27 | 13.9 | 11.4 | 0.89 |
| 3 | 0.3 | 0.13 | 40 | 20 | 0.8 | 8.2 | 11.5 | 70 | 0.62 | 10.1 | 11.1 | 0.53 |

EVAOH

TABLE 5-continued

| Run No. | Amount of EPR (wt. %) | Laminating thickness (microns) | Ethylene content (mole %) | Degree of saponification (%) | Thickness (microns) | Laminating speed (meters/min.) | Stretching conditions | | Results | |
|---|---|---|---|---|---|---|---|---|---|---|
| | | | | | | | Temperature (°C.) | Stretch ratio | Haze (%) | Appearance |
| 1 | 10 | 20 | 45 | 99.5 | 40 | 60 | 150 | 10 | — | Blushing |
| 2 | 10 | 20 | 45 | 99.5 | 40 | 60 | 149 | 10 | — | Blushing |
| 3 | 10 | 20 | 45 | 99.5 | 40 | 60 | 150 | 10 | — | Blushing |

EXAMPLE 9

The procedure of Example 7, No. 1 (Table 3) was repeated except that a continuous stretching machine kept at 182° C. was used instead of the oven-type stretching machine used in Example 7, No. 1 and the stretching was carried out at a line speed of 50 meters/min. The resulting stretched composite film was free from blushing with a haze of 3.1%, and had a good quality.

What is claimed is:

1. A stretched composite film composed of a first film layer (A) of a saponified product of an ethylene/vinyl acetate copolymer, and melt-laminated respectively to both surfaces of the first film layer (A), second film layers (B) and (B') of a blend composed of an unsaturated carboxylic acid-grafted polypropylene and polypropylene, said blend having (i) an ethylene content, $C_2$, of at most 0.6% by weight; (ii) a melt flow index, MFI, of not more than 25 g/10 minutes; (iii) the ethylene content ($C_2$) and the melt flow index (MFI) satisfying the expression log MFI$\leq$1.4(1−$C_2$); and (iv) a melt flow index ratio, MFIR, of not more than 12.

2. The composite film of claim 1 wherein the saponification product of ethylene/vinyl acetate copolymer has a degree of saponification of at least 90%.

3. The composite film of claim 2 wherein the saponification product of ethylene/vinyl acetate copolymer has a degree of saponification of at least 99%.

4. The composite film of claim 1 wherein the ethylene/vinyl acetate copolymer contains 15 to 50 mole% of ethylene units.

5. The composite film of claim 4 wherein the ethylene/vinyl acetate copolymer contains 20 to 40 mole% of ethylene units.

6. The composite film of claim 1 wherein the blend has an ethylene content of not more than 0.4% by weight.

7. The composite film of claim 1 wherein the blend has an MFI of 1 to 20 g/10 minutes.

8. The composite film of claim 1 wherein the blend is prepared by melt-kneading the polypropylene in an oxygen-containing gas atmosphere to decompose it and followed by blending with the unsaturated carboxylic acid-grafted polypropylene.

9. The composite film of claim 1 wherein the unsaturated carboxylic acid-grafted polypropylene is maleic anhydride-grafted polypropylene.

10. The composite film of claim 9 wherein the maleic anhydride-grafted polypropylene contains 0.01 to 15% by weight of maleic anhydride.

11. The composite film of claim 1 wherein the polypropylene in the blend of it with the unsaturated carboxylic acid-grafted polypropylene has an MFI of 0.1 to 25 g/10 minutes.

12. The composite film of claim 1 wherein the second film layers (B) and (B') further contains another polyolefin.

13. The composite film of claim 12 wherein the amount of the other polyolefin is 5 to 100 parts by weight per 100 parts by weight of the blend.

14. A stretched composite film composed of a first film layer (A) of a saponified product of an ethylene/vinyl acetate copolymer, second film layers (B) and (B') of a blend composed of an unsaturated carboxylic acid-grafted polypropylene and polypropylene melt-laminated respectively to both surfaces of the first film layer (A), and a third film layer (C) of a thermoplastic synthetic resin melt-laminated to the surface of one of the second film layers (B) and (B'), said blend in the second film layers having (i) an ethylene content, $C_2$, of at most 0.6% by weight; (ii) a melt flow index, MFI, of not more than 25 g/10 minutes; (iii) the ethylene content ($C_2$) and the melt flow index (MFI) satisfying the expression log MFI$\leq$1.3(1−$C_2$); and (iv) a melt flow index ratio, MFIR, of not more than 12.

15. The composite film of claim 14 wherein the saponification product of ethylene/vinyl acetate copolymer has a degree of saponification of at least 90%.

16. The composite film of claim 15 wherein the saponification product of ethylene/vinyl acetate copolymer has a degree of saponification of at least 99%.

17. The composite film of claim 14 wherein the ethylene/vinyl acetate copolymer contains 15 to 50 mole% of ethylene units.

18. The composite film of claim 17 wherein the ethylene/vinyl acetate copolymer contains 20 to 40 mole% of ethylene units.

19. The composite film of claim 14 wherein the blend has an ethylene content of not more than 0.4% by weight.

20. The composite film of claim 14 wherein the blend has an MFI of 1 to 20 g/10 minutes.

21. The composite film of claim 14 wherein the blend is prepared by melt-kneading the polypropylene in an oxygen-containing gas atmosphere to decompose it and followed by blending with the unsaturated carboxylic acid-grafted polypropylene.

22. The composite film of claim 14 wherein the unsaturated carboxylic acid-grafted polypropylene is maleic anhydride-grafted polypropylene.

23. The composite film of claim 14 wherein the maleic anhydride-grafted polypropylene contains 0.01 to 15% by weight of maleic anhydride.

24. The composite film of claim 14 wherein the polypropylene in the blend of it with the unsaturated carboxylic acid-grafted polypropylene has an MFI of 0.1 to 25 g/10 minutes.

25. The composite film of claim 14 wherein the second film layers (B) and (B') further contains another polyolefin.

26. The composite film of claim 25 wherein the amount of the other polyolefin is 5 to 100 parts by weight per 100 parts by weight of the blend.

27. The composite film of claim 14 wherein the thermoplastic synthetic resin is polypropylene.

* * * * *

UNITED STATES PATENT AND TRADEMARK OFFICE
CERTIFICATE OF CORRECTION

PATENT NO. : 4,472,485
DATED : September 18, 1984
INVENTOR(S) : Tabuse et al.

It is certified that error appears in the above—identified patent and that said Letters Patent is hereby corrected as shown below:

Claim 14, line 26 should read: $MFI \leq 1.4(1-C_2)$

Signed and Sealed this

Second Day of April 1985

[SEAL]

Attest:

DONALD J. QUIGG

*Attesting Officer*  *Acting Commissioner of Patents and Trademarks*